Patented June 26, 1945

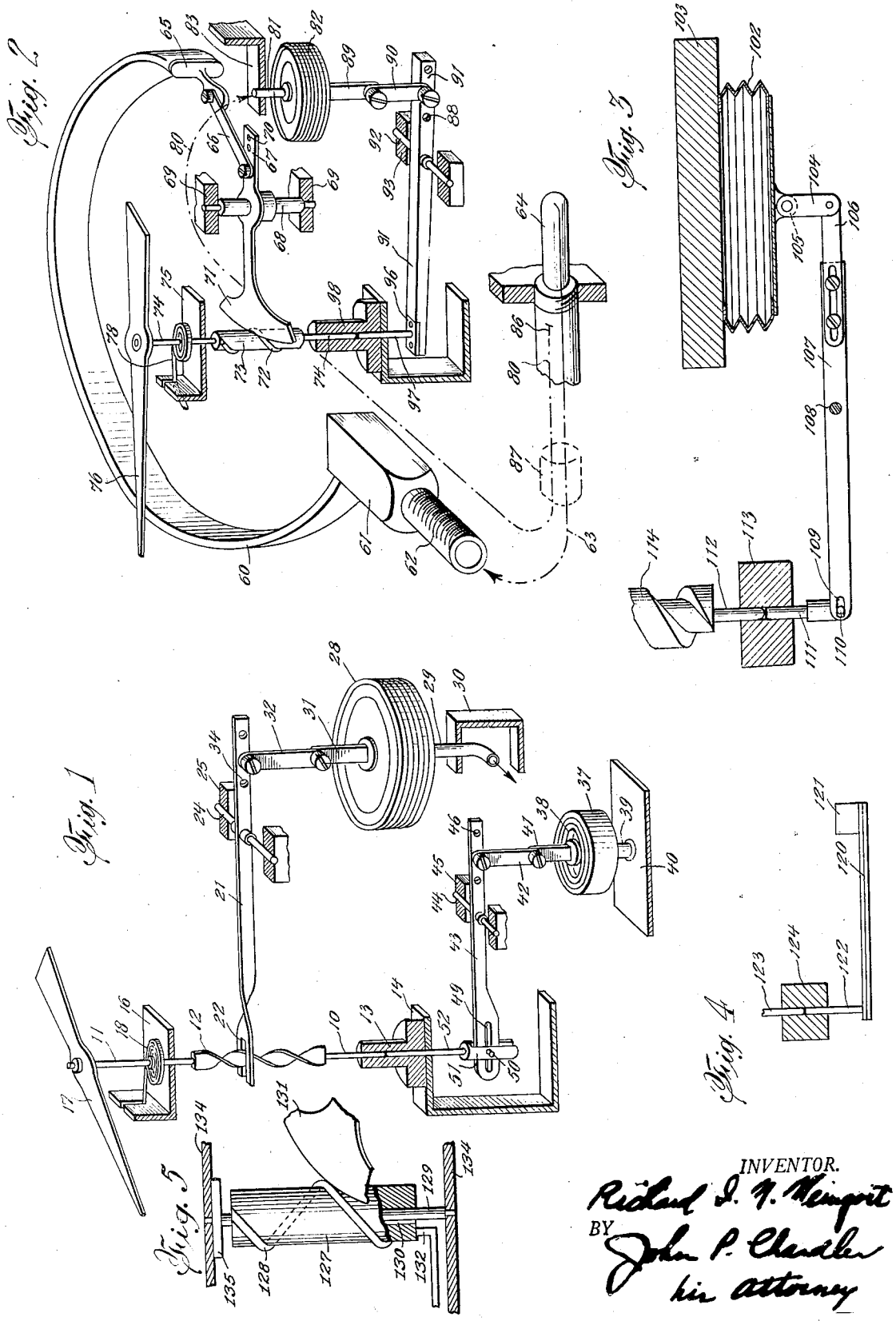

2,379,328

UNITED STATES PATENT OFFICE 2,379,328

COMPENSATING SYSTEM FOR CONDITION RESPONSIVE MEASURING INSTRUMENTS

Richard I. N. Weingart, Glen Head, N. Y.

Application April 21, 1943, Serial No. 483,858

13 Claims. (Cl. 73—370)

This invention relates to an improved compensating or differential system for measuring instruments, both indicating and recording, and has for its principal object the provision of an improved apparatus and method for correcting the reading in measuring instruments, for changes in barometric pressure, ambient or instrument casing temperatures, and the like. In other words, the present invention is directed to an improved means of impressing upon one indicator the sum or difference of the movement of two condition-responsive elements.

Measuring instruments, such as pressure gauges, altimeters, thermometers, and the like, are initially calibrated under certain conditions of temperature and atmospheric pressure, and in their subsequent use they are accurate only if used under those identical conditions. For most purposes, a high order of accuracy is not required, but in cases wherein it is, some compensating system must be employed unless individual corrections are made at each reading, which is time-consuming and quite impossible in the case of recording instruments.

Any thermometer system, for instance, employing a capillary tube is subject to the temperature which is being measured in the sensitive bulb, and also to the ambient temperatures to which the capillary tubing and the instrument case are subjected. If the ratio between the bulb volume and the tube volume is large enough, the error can be reduced to a certain extent, but this is seldom practical. Where the greatest accuracy is required, however, the usual method of compensating for the error is to employ a secondary actuating mechanism of identical size and filling, coupled in opposition to the primary actuating mechanism. The second tube is run parallel to the bulb capillary so the errors that develop along the tubing are compensated for. In the event that only the temperature in the instrument casing is to be compensated for, some simple temperature-responsive element, such as a bi-metallic strip, is used as a part of the linkage to the pointer shaft or pen arm.

So far as is known, in every instance in the prior art wherein a fully compensated system has been provided for, the secondary responsive mechanism is connected to, and works directly in opposition to, or in conjunction with, the primary condition-responsive means. In other words, in pressure gauges, for instance, those employing a Bourdon tube or a metallic bellows, there is a movement for translating the substantially longitudinal motion of the primary responsive element into rotary motion in the pointer shaft or pen arm. There also is a direct linkage connection between the secondary responsive element and this primary translating movement. This arrangement necessitates a relatively large number of pivots between the two responsive elements and the eventual pointer shaft with the usual number of links, bell crank or other levers, or the like. The maintenance cost of instruments of this character is high since bearings and shafts wear down, and the instrument soon becomes inaccurate, due to the friction in the increased linkage.

Instruments of this character are also difficult to calibrate since the two responsive elements must be separately calibrated to cause the individual changes in conditions to be properly impressed upon the pointer shaft or pen arm. A change of calibration in one element affects the existing calibration of the other, thus necessitating back-and-forth calibration until a satisfactory mean is reached. In the present invention, the calibration of each of the respective elements, in its effect on the pointer, may be made separately, and the change in calibration in one element in no way affects the response of the pointer to the other. It is a particular object of the present invention to provide an improved compensating system and apparatus which will avoid all of the aforementioned difficulties, and will provide a more accurate and fully compensated measuring instrument at lesser initial cost, and which has a far less cost of upkeep.

A measuring instrument employing a compensating system of the present invention utilizes a movement wherein the driven element is a generally cylindrical member having an external helical fin or thread, or a helical recess, and wherein the driving element is a member which works against the thread, usually in a cam-like manner, and may comprise a single-surfaced driving cam or single-toothed gear having a driving surface disposed generally to the lead angle of the helical fin, the driving cam being mounted on a shaft generally parallel with the axis of the driven element. The driving element, on the other hand, may include a member moving generally parallel with the axis of the driven member, and include a portion which contacts the spiral thread. Other forms of driving elements for this type of helical driven member may also be used.

In accordance with the present invention, the primary condition-responsive means are connected directly to the driving element of the movement, and have no connection of any character with the secondary-responsive means. Movement of the secondary-responsive means, however, is impressed upon the system by means of a thrust-bearing element working longitudinally with relation to the shaft of the driven member.

A further object of the invention is to provide an automatic compensating system for measuring instruments. A still further object of the invention is to provide a novel mechanical movement wherein two separate driving members, each acting independently of the other, may act upon a driven shaft. Another object of the invention is the provision of a unique mechanical movement comprising a helical member associated with a shaft which is journalled for rotative and longitudinal movement. One element, which may be a driving element, comprises a member which acts upon the helical surface. The shaft may be moved, also, longitudinally of its axis by means of another element acting upon it. The movement of either of these driving elements separately produces clockwise or counter-clockwise rotation in the shaft, depending upon the direction in which it moves. When both driving members act simultaneously, the resultant movement of the shaft is proportionate to the sum or difference of these applied movements.

In the drawing:

Fig. 1 is a perspective view, partly in section, of one compensating system embodying the present invention.

Fig. 2 is a perspective view, partly in section, of another compensating system of the present invention.

Fig. 3 shows an alternative form of thrust-bearing element for the end of the driven shaft.

Fig. 4 shows the use of a bi-metallic element.

Fig. 5 is a side elevation of a slightly modified form of the present invention wherein the helical element is keyed to the shaft for longitudinal, though not rotative, movement relative to such shaft, the secondary driving element producing longitudinal movement of the helical element and not to the shaft.

The drawings are quite schematic in character and are not intended as working drawings. The operative parts of the system shown in Fig. 1 may also be positioned within a suitable housing (not shown), the moving parts being journalled in frame members which are shown in a fragmentary manner. Thus, the driven element consists of a shaft formed in two axially aligned sections 10 and 11, and having a helical or spiral element 12 therebetween. The spiral element, in this instance, is illustrated as being formed from an elongated strip of flat sheet metal twisted in the manner shown. Shaft section 10 is journalled in bearing element 13 supported on frame member 14. Shaft section 11 is journalled in a frame member 16 and carries a conventional pointer 17 at its outer end. A hair spring 18 is adapted to keep the gear parts tight and prevent backlash.

The driving member consists of a centrally-pivoted lever or driving arm 21 having a bifurcated or forked end portion 22 which receives the spiral between the arms of such forked portion. The lever is mounted on shaft 24, which is journalled in spaced frame members 25 at right angles to the axis of the driven shaft 10—11. In this instance, the primary condition-responsive element is a vacuum bellows 28 having a tube 29 at the lower end which passes to the vacuum area which is to be measured. Tube 29 is rigidly mounted on the bellows, and such tube, in turn, is mounted on a bracket 30 comprising a portion of the frame member. A fixed arm 31 is carried on the upper surface of the bellows, and such arm is connected by means of a link 32 with one terminal of driving lever 21. This terminal of the driving lever may have a plurality of apertures 34 therein to permit calibration of the driving member.

The auxiliary or compensating system comprises, in this instance, a diaphragm unit 37 having a diaphragm 38 on its upper surface which is responsive to changes in barometric pressure. The diaphragm unit 37 may be rigidly mounted by means of support 39 on frame member 40. A post 41 is rigidly secured on the upper surface of the diaphragm, such post being connected by means of link 42 with one terminal of driving arm 43. This arm is mounted on a shaft 44 pivotally supported in frame elements 45. At one end, the arm likewise has a plurality of apertures 46 to permit calibration, and at its other end the arm has an elongated slot 49 which receives a pin 50 associated with a bifurcated member 51 which is carried at the lower end of a thrust-bearing element 52. The upper end of this thrust-bearing member contacts the lower end of shaft 10. Accordingly, it will be seen that as the vacuum to be measured increases, bellows element 28 contracts, thereby causing arm 31 and link 32 to move downwardly, thereby elevating the opposite end of driving arm 21. This causes shaft 11 to rotate in a clockwise direction.

Downward movement of the upper or free end of bellows unit 28 is caused by an increase in the vacuum in tube 29. Strictly speaking, however, downward movement of the bellows unit is brought about by atmospheric pressure acting externally. Accordingly, the movement increases or decreases for any given degree of vacuum, according to the changes of atmospheric pressure. It will be apparent, then, that the reading of pointer 17 is accurate only when the instrument is used under barometric pressures which are the same as when the instrument was calibrated. In the present system, however, the barometric pressure also acts upon diaphragm 38, and as this pressure increases, the diaphragm is depressed, thereby causing post 41 and arm 42 to move the right-hand end of driving arm 43 downwardly, thus raising the opposite end and causing thrust bearing 52 to move upwardly, thus also raising driven shaft 10. This imparts counter-clockwise rotation to shaft 11 and pointer 17 as a result of the screw action between helical element 12 and the forked driver 22.

If, on the other hand, there is a decrease in barometric pressure, the reverse action takes place, thereby, in either instance, compensating for the error of indication of vacuum by the pointer for any given degree of vacuum, which error might be caused by a variation of barometric pressure from that under which the instrument was calibrated. Thus, the final result indicated by the pointer is the result of the movement of bellows 28, resulting from the atmospheric pressure, minus the degree of such increased movement caused by the increase, or plus the degree of such decreased movement caused by the decrease of atmospheric pressure from that under which the instrument was originally calibrated.

Fig. 2 shows a compensated thermometer system filled, of course, with mercury or other fluid substance which expands and contracts with changes in temperature, and comprising the usual Bourdon tube 60 mounted in a block 61 which is provided with a connection 62 to which is secured a conventional capillary tube designated in broken lines at 63, which leads to a thermometer bulb 64 which is positioned inside a boiler or other structure, the temperature of which is to be measured. As the temperature in the structure increases, the pressure in the capillary tube and in the Bourdon tube increases, thus imparting movement to the outer terminal 65 of the Bourdon tube. A link 66 connects this outer end to one end of a driving arm 67 which is carried on a shaft 68 pivotally mounted at 69 in suitable frame elements. A plurality of apertures 70 in this terminal of the arm 67 permit calibration of the primary thermometer system.

The driving member comprises a generally sector-shaped cam element 71 mounted at the opposite end of arm 67, the driving surface of which engages a generally helical thread 72 formed on the exterior surface of a substantially cylindrical driven element 73 mounted on shaft 74. This driving surface of cam element 71 is disposed generally to the lead angle of the helical thread. The upper end of shaft 74 is journalled at 75 in a frame member and also carries a pointer 76. Rotation of the driven member in one direction is caused by movement of the driving surface of cam 71 against the external fin or thread 72, and rotation in the opposite direction is caused by means of a hair spring 78, as opposite movement of cam 71 permits opposite rotation of the thread element 72.

The ambient temperature-compensating system comprises a second capillary tube 80 which is connected at 81 to a bellows unit 82, tube 81 being rigidly secured to a bracket 83 comprising a portion of the frame element. Tube 80, as it leaves the instrument casing, closely follows tube 63 to its end and stops just short of, and outside, the boiler or other unit, the temperature of which is being measured. The outer terminal of tube 80 is indicated at 86. The length of tubes 63 and 80 may, in some instances, be several hundred feet, and in accordance with usual practice, the two tubes are covered as by some covering element 87. Secondary capillary tube 80 is subjected to the same temperature variations as is tube 63, except that auxiliary tube 80 stops short of the boiler.

The operation of this system is as follows: Temperature in the boiler acting on the contents of bulb 64, plus the temperature surrounding capillary tube 63 acting on the contents thereof, plus the temperature acting on the contents of Bourdon tube 60, causes expansion of the entire confined substance, producing movement at the free end of the Bourdon tube. By virtue of the linkage arrangement between such free end 65 and the driving arm 67, such movement of the Bourdon tube is imparted to the driving face of driving cam 71, thus permitting clockwise rotation of shaft 74 due to the action of hair spring 78. When the temperatures decrease, counter-clockwise rotation of the driven shaft results. The reading of the pointer at this point would indicate not only the expansion or contraction due to changes of temperature affecting bulb 64, but also any expansion or contraction caused by changes of temperatures surrounding the capillary tube 63 and the Bourdon tube 60. It is, however, desired only to indicate the expansion or contraction due to the temperature surrounding bulb 64.

Accordingly, the influence of changes in the ambient temperature surrounding the capillary tube 63 and Bourdon tube 60 should be subtracted from, or added to, this reading, as the case may be, by the secondary system comprising capillary tube 80 and bellows 82, which are subjected to the same temperatures as are the capillary tube 63 and Bourdon tube 60. Thus, as the ambient temperatures increase, the bellows 82 expands, thereby causing the links 89 and 90 to move downwardly, thereby raising the upper end of driving arm 91, acting on thrust-bearing pin 97. This moves shaft section 74 upwardly, imparting counter-clockwise rotation to this shaft as a result of the screw action between driving cam 71 and external thread 73. This, when properly calibrated, subtracts that movement of the pointer caused by any increase of temperature surrounding capillary tubing 63 and Bourdon tube 60.

When there is a decrease in ambient temperatures, the reverse action takes place. It will be apparent that the calibrating of the primary responsive system is in no way affected or disturbed by the calibration of the secondary system, or vice versa, as was earlier pointed out. This calibration may be effected while keeping the temperature of the bulb 64 constant, and changing the ambient temperatures of tubes 63 and 80, and the temperature surrounding Bourdon tube 60 and bellows 82, all as will be appreciated by those skilled in the art.

In the arrangement shown in Fig. 3, a bellows unit 102 is mounted on a frame element 103. A link 104 is pivotally connected at 105 to the bottom of the bellows. Link 104 is connected with an extensible portion 106 of driving arm 107, which latter is centrally pivoted at 108. At its opposite end, driving arm 107 is slotted, as shown at 109, and receives a pin 110 passing through a thrust-bearing element 111 which acts against the lower end of shaft 112, which is journalled at 113 in the frame element. Shaft 112 carries the driven helical element 114. This view shows merely an alternative linkage arrangement for connecting the secondary responsive element with the thrust-bearing element acting against one end of the driven shaft. In Fig. 4, a bi-metallic element 120 is mounted at 121 rigidly in the frame. The free end of the bi-metallic element engages a thrust-bearing pin 122 which engages the lower end of driven shaft 123, which is journalled in bearing member 124.

It will be apparent that the system of the present invention may also be used to show the differential in movement of two separate elements responsive to changes in conditions, one of which is connected to the primary driving element 67, and the other of which is connected to the secondary driving element 91. When the movement of these elements is equal, and the movements are arranged in opposition to each other, the movement of the one will have a clockwise rotating effect on the pointer, and the movement of the other will have an equal counter-clockwise rotating effect on the pointer, thereby causing the pointer to remain stationary. Should the movement of the primary element be greater than that of the secondary element, such excess will be indicated by clockwise rotation of the pointer shaft. Should the reverse be true, counter-clockwise rotation would indicate such difference. Such a system will be particularly useful in maintaining equal pressure in two boilers, or in maintaining equal temperatures in two chemical manufacturing processes, and in many other instances wherein duplex gauges or the like are sometimes used. The use of the present system is also much more effective where it is desirable to indicate the sum of two movements, in which case the two elements are arranged to operate the pointer in the same direction.

The movement of the present invention may have a variety of uses other than in compensated measuring systems or in measuring instruments generally, all as will be appreciated by those skilled in the art. Also, the structures shown and described may be modified considerably without departing from the spirit of the invention. For instance, the secondary movement which produces rotation by moving the shaft longitudinally need not necessarily contact the end of the shaft. If desired, the shaft may have a fixed collar with an annular, peripheral recess which receives a forked driver which may move the shaft in either direction.

Also, it will be apparent that the second driving element need not work directly upon the shaft as by the thrust-bearing element 52 of Fig. 1 or 97 of Fig. 2, or against the fixed collar just mentioned. For instance, the helical element, instead of being rigidly mounted on, or formed integrally with, the driven shaft, may be arranged in the manner shown in Fig. 5 wherein cylindrical member 127 formed with helical element 128 may be mounted on shaft 129 and be movable longitudinally thereof. A key element or spline 130 interlocks the cylindrical member 127 and shaft 129, so that there can be relative longitudinal movement therebetween but not relative rotative movement. Sector-shaped cam element 131 is the primary driving element, and pin 132 may be the secondary driving element, such pin contacting the end of cylindrical member 127. Shaft 129 may be journalled in frame members 134, and the usual hair spring 135 may be employed for driving the shaft in one direction. When this secondary driving element 132 moves against the end of element 127, such element is rotated without, however, producing longitudinal movement in shaft 129.

What I claim is:

1. In a combined measuring instrument and compensating system therefor, the combination of primary means responsive to changes in a condition, and a secondary means responsive to changes in an auxiliary condition, indicating means including a shaft, a movement for translating motion of the primary responsive means into rotary movement of the indicating shaft comprising a helical driven member associated with the shaft, and a driving member contacting the helical member and exerting a thrust against the same to impart rotation thereto, means connecting the primary condition-responsive means with the driving member, a movable thrust-bearing element contacting the shaft, and means connecting the secondary condition-responsive means to said movable thrust bearing for producing longitudinal movement of the shaft, thus imparting rotation thereto independent of the rotation imparted by movement of the primary driving member.

2. In a measuring instrument of the character described, the combination of a first means responsive to changes in a condition, and a second means responsive to changes in an auxiliary condition, indicating means including a shaft, a movement for translating motion of the first condition-responsive means into rotary movement of the indicating shaft comprising a helical driven member associated with the shaft, and a driving member contacting the helical member and exerting a thrust against the same to impart rotation thereto, means connecting the first condition-responsive means with the driving member, means for translating the motion of the second condition-responsive means into rotary movement of the pointer shaft, independent of the motion of the first condition-responsive means, said translating means comprising a movable thrust-bearing element contacting the shaft, and means connecting the second condition-responsive means with said thrust-bearing element.

3. In a combined measuring instrument and compensating system therefor, the combination of primary means responsive to changes in a condition such as temperature, pressure, or the like, and a secondary means responsive to changes in an auxiliary condition, such as ambient temperature, temperature of instrument casing, atmospheric pressure, or the like, a pointer shaft and a pointer carried thereby, a movement for translating motion of the primary condition-responsive means into rotary movement of the pointer shaft comprising a helical driven member associated with the pointer shaft, and a driving member contacting the helical member and exerting a thrust against the same to impart rotation thereto, means connecting the primary condition-responsive means with the driving member, a movable thrust-bearing element contacting the pointer shaft to move the same longitudinally, and means for translating movement of the secondary condition-responsive means into longitudinal movement of the pointer shaft, thus imparting rotation thereto independent of the rotation imparted by the primary driving member, said means comprising a connecting element between the secondary condition-responsive means and the thrust-bearing element.

4. In a measuring instrument having means responsive to changes in a condition, indicating means comprising a pointer shaft and a pointer carried thereby, a movement for translating motion of the condition-responsive means into rotary movement of the pointer shaft comprising a helical driven member associated with the pointer shaft, and a primary driving member contacting the helical member and exerting a thrust against the same to impart rotation thereto, and means connecting the condition-responsive means with the driving member, the combination of a compensating system for the measuring instrument comprising a secondary means responsive to changes in an auxiliary condition, a movable thrust-bearing element contacting the pointer shaft, and means for translating movement of the secondary condition-responsive means into longitudinal movement of the pointer shaft, thus imparting rotation thereto independent of the rotation imparted by the primary driving member, said means comprising a connecting element between the secondary condition-responsive means and the thrust-bearing element.

5. In a measuring instrument provided with a compensating system, the combination of a frame, primary means responsive to changes in a condition, such as temperature, pressure, altitude, or the like, mounted in the frame, and a secondary means responsive to changes in an auxiliary condition such as ambient temperature, temperature of instrument casing, atmospheric pressure, or the like, condition-indicating means including a shaft journalled in the frame having a pointer or a pen arm carried by the shaft, a movement for translating motion of the primary condition-responsive means into rotary movement of the shaft comprising a helical driven member mounted on the shaft, and a primary driving member comprising a generally sector-shaped driving cam contacting the helical member and exerting a thrust against the same to impart rotation thereto, means connecting the primary condition-responsive means with the driving member, a movable thrust-bearing element contacting the shaft, and means for translating movement of the secondary condition-responsive means into longitudinal movement of the shaft, thus imparting rotation thereto independent of the rotation imparted by the primary driving member, said means comprising a connecting element between the secondary condition-responsive means and the thrust-bearing element.

6. In a compensated thermometer system, the combination of primary means responsive to temperature changes, a thermometer bulb positioned in the zone to be measured, and secondary means responsive to changes in ambient temperature, a capillary tube connecting the bulb with the primary temperature-responsive means, and a second capillary tube positioned adjacent to the first tube but terminating short of said zone, said second tube being connected with the secondary temperature-responsive means, a pointer shaft and a pointer carried thereby, a movement for translating motion of the primary temperature-responsive means into rotary movement of the pointer shaft comprising a helical driven member associated with the pointer shaft, and a primary driving member contacting the helical member and exerting a thrust against the same to impart one-way rotation thereto, and spring means for imparting opposite rotation to the shaft, means connecting the primary temperature-responsive means with the driving member, a movable thrust-bearing element contacting one end of the pointer shaft, and means for translating movement of the secondary temperature-responsive means into longitudinal movement of the pointer shaft, thus imparting rotation thereto against the action of the spring means, independent of the rotation imparted by the primary driving member, said means comprising a link connection between the secondary temperature-responsive means and the thrust-bearing element.

7. In a combined measuring instrument and compensating system therefor, the combination of primary and a secondary means responsive to changes in conditions, a pointer shaft and a pointer carried thereby, a movement for translating motion of the primary condition-responsive means into rotary movement of the pointer shaft comprising a helical driven member carried by the pointer shaft, and a primary driving member formed with a driving face disposed generally to the lead angle of the helical member and contacting such helical member, and exerting a thrust against the same to impart rotation thereto in one direction, a spring for rotating the shaft in the opposite direction as such opposite rotation is permitted by opposite movement of the driving member, means connecting the primary condition-responsive means with the driving member, a movable thrust-bearing element contacting the pointer shaft, and means for translating movement of the secondary condition-responsive means into longitudinal movement of the pointer shaft, thus imparting rotation thereto independent of the rotation imparted by the primary driving member, said means comprising a connecting element between the secondary condition-responsive means and the thrust-bearing element.

8. In a movement for a measuring instrument having a plurality of means responsive to changes in conditions, the combination of a pointer shaft, a helical driven member associated with the shaft, and a driving member contacting the helical member and exerting a thrust against the same to impart rotation thereto, means connecting one of such condition-responsive means with the driving member, a movable thrust-bearing element contacting the shaft, and means connecting a second responsive means with the thrust-bearing element for imparting longitudinal movement to the shaft and causing rotation as a result of the screw action between the first driving means and the helical member.

9. In a movement for measuring instruments having a plurality of means responsive to changes in conditions, the combination of a pointer shaft, a helical driven member associated with the shaft and being movable longitudinally thereof, means comprising a key element for interlocking the helical member and the shaft so as to permit longitudinal movement therebetween but not relative rotative movement, a driving member contacting the helical member and exerting a thrust against the same to impart rotation thereto, means connecting one of such condition-responsive means with the driving member, a movable thrust-producing element contacting one end of the helical driven member, and means connecting a second responsive means with the thrust-producing element for imparting longitudinal movement to such helical element and causing rotation thereto as a result of the screw action between the first driving means and the helical member.

10. In a movement for a measuring instrument having means responsive to changes in a condition, the combination of a frame, a driven shaft, journal means in the frame comprising bearings which permit rotary movement of the shaft as well as longitudinal movement thereof relative to its axis, a helical member associated with the shaft, an element contacting the helical member on the pitch helix thereof, a movable thrust-bearing element contacting one end of the shaft, and means connecting the condition-responsive means with the thrust-bearing element, thus producing, when such thrust-bearing element is moved by the condition-responsive means, rotation of the shaft as a result of the screw action between the helical member and the element contacting such helical member on its pitch helix.

11. In a movement for a measuring instrument having means responsive to changes in a condition, the combination of a frame, a driven shaft, journal means in the frame comprising bearings which permit rotary movement of the shaft as well as longitudinal movement thereof relative to its axis, a helical member associated with the shaft, an element contacting the helical member on the pitch helix thereof, a movable thrust-producing element arranged to move the shaft and the helical member longitudinally of their axes, and means connecting the condition-responsive means with the movable thrust-producing element, thus causing, when such thrust-producing element is moved by the condition-responsive means, rotation of the shaft as a result of the screw action between the helical member and the element contacting such helical member on its pitch helix.

12. In a movement for a measuring instrument having means responsive to changes in a condition, the combination of a frame, a driven shaft, a helical member associated with the shaft and being movable longitudinally thereof, means comprising a key element for interlocking the helical member and the shaft so as to permit longitudinal movement therebetween but not relative rotative movement, an element contacting the helical member on the pitch helix thereof, a movable thrust-producing element contacting one end of the helical member, and means connecting the condition-responsive means with such thrust-producing element, thus causing, when such thrust-producing element is moved by the condition-responsive means, rotation of the shaft as a result of the screw action between the helical member and the element contacting such helical member on its pitch helix.

13. In a measuring instrument of the character described, the combination of a first means responsive to changes in a condition, and a second means responsive to changes in an auxiliary condition, indicating means including a shaft, journal means for the shaft permitting rotative movement of such shaft as well as movement thereof longitudinally of its axis a movement for translating motion of the first condition-responsive means into rotary movement of the indicating shaft comprising a helical driven member associated with the shaft, and a driving member contacting the helical member and exerting a thrust against the same to impart rotation thereto, means connecting the first condition-responsive means with the driving member, means for translating the motion of the second condition-responsive means into rotary movement of the pointer shaft, independent of the motion of the first condition-responsive means, said translating means comprising a movable thrust-producing element arranged to move the shaft and the helical member longitudinally of their axes, means connecting the second condition-responsive means with the thrust-producing element, thus causing, when such thrust-producing element is moved by the second condition-responsive means, rotation of the shaft as a result of the screw action between the helical member and the driving member contacting such helical member.

RICHARD I. N. WEINGART.